United States Patent
Milley

(10) Patent No.: US 6,703,064 B1
(45) Date of Patent: Mar. 9, 2004

(54) NATURAL PEANUT BUTTER

(75) Inventor: Christopher J. Milley, Orrville, OH (US)

(73) Assignee: The J. M. Smucker Company, Orrville, OH (US)

( * ) Notice: Subject to any disclaimer, the term of this patent is extended or adjusted under 35 U.S.C. 154(b) by 37 days.

(21) Appl. No.: 10/103,284

(22) Filed: Mar. 20, 2002

Related U.S. Application Data

(60) Continuation of application No. 09/846,535, filed on May 2, 2001, now abandoned, which is a division of application No. 09/580,413, filed on May 30, 2000.

(51) Int. Cl.[7] .................................................. A23L 1/36
(52) U.S. Cl. ........................ 426/633; 426/580; 426/581; 426/601; 426/654
(58) Field of Search ................................. 426/580, 581, 426/601, 633, 654

(56) References Cited

U.S. PATENT DOCUMENTS

| | | |
|---|---|---|
| 1,395,934 A | 11/1921 | Stockton |
| 2,496,461 A * | 2/1950 | Fisher ........................ 426/633 |
| 2,504,620 A | 4/1950 | Avera |
| 2,521,243 A | 9/1950 | Mitchell, Jr. |
| 2,552,925 A | 5/1951 | Avera |
| 2,562,630 A | 7/1951 | Mitchell, Jr. |
| 2,688,554 A | 9/1954 | Avera |
| 3,127,272 A | 3/1964 | Baker et al. |
| 3,129,102 A | 4/1964 | Sanders |
| 3,265,507 A | 8/1966 | Japikse |
| 3,671,267 A | 6/1972 | Gooding et al. |
| 3,772,038 A | 11/1973 | Ayres et al. |
| 4,288,378 A | 9/1981 | Japikse et al. |
| 4,341,814 A | 7/1982 | Mc Coy |
| 4,762,725 A | 8/1988 | Player et al. |
| 6,017,388 A | 1/2000 | Yuan |
| 6,022,577 A | 2/2000 | Chrysam et al. |
| 6,153,250 A * | 11/2000 | Schumacher ................ 426/633 |

OTHER PUBLICATIONS

Swern, D. 1979. Bailey's Fats and Oils., John Wiley & Sons, NY, pp. 16, 100, 101, 294.*

* cited by examiner

Primary Examiner—Helen Pratt
(74) Attorney, Agent, or Firm—Calfee, Halter & Griswold, LLP

(57) ABSTRACT

An all natural ingredient peanut butter and/or peanut butter spread which contains a homogeneous mixture of peanut particles, peanut oil and a natural stabilizer. The natural stabilizer forms a matrix with the peanut particles and peanut oil to inhibit or prevent the settling of the peanut particles from the peanut oil. The natural stabilizer includes natural, unmodified fatty acids and less than 2 weight percent water.

4 Claims, 2 Drawing Sheets

NATURAL PEANUT BUTTER

This application is a continuation of U.S. application Ser. No. 09/846,535 filed May 2, 2001, now abandoned which in turn is a divisional of U.S. application Ser. No. 09/580,413 filed May 30, 2000.

This invention relates to peanut butter, and more specifically to peanut butter and a manufacturing process for making peanut butter that contains all natural ingredients.

BACKGROUND OF THE INVENTION

Peanut butters are customarily made by first roasting and blanching raw peanuts to clean the peanuts and to remove much of the moisture from the peanuts. The cleaned and roasted peanuts are then subsequently ground to form a pasty material which is a mixture of peanut particles and peanut oil. The pasty material is typically cooled to form peanut butter and packaged for later use. If the peanut butter is allowed to stand for a period of time, the peanut oil will begin to separate from the peanut particles and form a separate layer on top of the particles and leave a rigid crumbly peanut particle mass underneath.

Several additives have been developed to inhibit or prevent the peanut oil from forming a separate layer after a period of time. Typically, a stabilizer is added to the peanut particle and peanut oil mixture to inhibit the peanut oil separation. It is known that the addition of hydrogenated oils, such as hydrogenated peanut oil, will help stabilize the peanut butter to prevent excessive amounts of peanut oil from separating from the peanut butter. The hydrogenated oils form a crystal matrix with the peanut oil and peanut particles which then forms a rigid mass and inhibits the settling of the a peanut particles from the peanut oil. However, if too much hydrogenated oils are added to the peanut butter to prevent peanut oil separation from the peanut particles, the large amount of hydrogenated oils will cause the peanut butter to become excessively firm resulting in a difficult to spread product that has a waxy taste and undesirably clings to the roof of the mouth when eaten.

As a result, a wide variety of stabilizers have been developed which prevent the separation of the peanut oil from the peanut particles without forming an overly firm product having a waxy aftertaste. Examples of such stabilizers are described in U.S. Pat. Nos. 1,395,934; 2,504,620; 2,521,243; 2,552,925; 2,562,630; 2,688,554; 3,129,103; 3,127,272; 3,265,507; 3,671,267; 4,288,378; and 4,341,814. Although these stabilizers are effective in preventing or inhibiting the peanut oil from separating from the peanut particles in the peanut butter, these stabilizers are all artificially produced. Many of these stabilizers are formed from natural oils which have been hydrogenated so as to saturate the carbon bonds with hydrogen. Other types of stabilizers modify natural oils by an interesterifying process. The addition of these actinically produced stabilizers result in a peanut butter product which does not contain all natural ingredients.

Recently, there has been a growing demand for organically grown products and all natural products. This trend is partially the result of a belief that products made by all natural ingredients are healthier than products which contain artificial ingredients. Although there are some peanut butters which are packaged and sold as containing only natural ingredients, these all natural peanut butters do not include stabilizers. As a result, these natural peanut butters exhibit peanut oil and peanut particle separation. The user must stir the peanut oil into the peanut butter prior to use. This mixing step can be very messy and inconvenient, the separation of the peanut oil from the peanut particles in the peanut butter creates an undesirable looking product for many individuals, and if the peanut oil and peanut particles are not throughly mixed, the peanut butter can have an undesired oily taste.

In view of the present state of the art of peanut butter, there is a demand for a peanut butter which includes all natural ingredients, and inhibits or prevents the separation of the peanut oil from the peanut particles over an acceptable shelf life time.

SUMMARY OF THE INVENTION

The present invention pertains to a peanut butter and,or peanut butter spread which contains essentially all natural ingredients. The peanut butter and/or peanut butter spread includes peanut particles, peanut oil and a natural stabilizer. The natural stabilizer forms a matrix with the peanut oil and peanut particles resulting in a firm peanut butter and/or peanut butter spread which resists the separation of the peanut oil from the peanut particles after the peanut butter and/or peanut butter spread has been packaged. The natural ingredient peanut butter and/or peanut butter spread is preferably produced by conventional methods. In one embodiment, raw peanuts are cleaned, roasted and blanched. The peanuts are then ground and/or pressed forming a pasty material made of peanut particles and peanut oil. In one aspect of this embodiment, the roasted peanuts are ground between metal grinding plates which have burrs or teeth, and the plates are spaced apart such that a small clearance between the grinding plates exists during the grinding process. The ground peanuts that are forced out the end of the plates are in the form of pasty material made of fine peanut particles in oil. During the grinding process, the resulting pasty material is maintained above about 100° F. and typically between about 120°–250° F. The natural stabilizer is added and mixed with the pasty mixture to form a substantially homogeneous mixture of peanut particles, peanut oil and natural stabilizer prior to packaging the peanut butter and/or peanut butter spread. In another embodiment, the natural stabilizer is added to the pasty mixture after the pasty mixture exits the grinders and prior to the pasty material being cooled. The natural stabilizer is mixed with the pasty material to form a substantially homogeneous mixture. In one aspect of this embodiment, the natural stabilizer is added to the pasty material in a solid or semi-solid form. When the natural stabilizer is added in a solid or semi-solid form, the temperature of the pasty material is typically maintained at a high enough temperature to cause the solid natural stabilizer to transform into a substantially liquid state so that a substantially homogeneous mixture of peanut particles, peanut oil and natural stabilizer is formed. In another aspect of this embodiment, the natural stabilizer is added in a liquid form. When the natural stabilizer is added in a liquid form, the temperature of the pasty material is typically maintained at a high enough temperature to prevent the liquid natural stabilizer from solidifying prior to forming a substantially homogeneous mixture of peanut particles, peanut oil and natural stabilizer. After the natural stabilizer is added to the peanut particles and peanut oil, the mixture is typically cooled and then packaged. In still another embodiment, the natural stabilizer is added to the pasty mixture after the pasty mixture has been fully or partially cooled. The natural stabilizer is mixed with the cooled pasty material to form a substantially homogeneous mixture and is then packaged. In one aspect of this embodiment, the natural stabilizer is added to the pasty material in a liquid form. When the natural stabilizer is added in a liquid form, the temperature of the pasty material is typically maintained at a high enough temperature to prevent the liquid natural stabilizer from solidifying prior to forming a substantially homogeneous mixture of peanut particles, peanut oil and natural stabilizer. After the natural stabilizer is added to the peanut particles and peanut oil, the mixture is packaged or further cooled then packaged. In yet another embodiment, a part of the natural stabilizer is added to the pasty mixture after the pasty mixture exits the grinders and prior to the pasty material being cooled, and the remainder of the natural stabilizer is added after the pasty mixture has been partially or fully cooled. In still yet another embodiment, the peanut butter and/or peanut butter spread includes at least about 75 weight percent peanut particles and peanut oil, and at least about 1 weight percent natural stabilizer. In one aspect of this embodiment, the peanut butter and/or peanut butter spread includes about 80–99.7 weight percent peanut particles and peanut oil, and about 0.3–15 weight percent natural stabilizer, preferably about 85–98 weight percent peanut particles and peanut oil, and about 2–10 weight percent natural stabilizer, and more preferably about 90–96 weight percent peanut particles and peanut oil, and about 4–8 weight percent natural stabilizer. Peanut butter is commonly referred to as peanut and peanut oil mixtures wherein the peanut and peanut oil content is at least 90 weight percent. Peanut butter spreads are products which contain less than 90 weight percent peanuts and peanut oil. The natural stabilizer can be used in both peanut butter and peanut butter spreads. The term peanut butter will be use to describe both peanut butter and peanut butter spreads.

In accordance with another aspect of the present invention, the peanut butter includes other natural additives. In one embodiment, the natural additives are added to the peanut particles and peanut oil mixture after the peanuts have been ground and before the mixture is fully cooled. In another embodiment, the natural additives are added to the peanut particles and peanut oil mixture after the peanuts have been ground and after the mixture is fully cooled. In still another embodiment, the natural additives include salt and/or a sweetening agent. In one aspect of this embodiment, a natural salt is added to the peanut butter. The salt content of the peanut butter is typically less than about 4 weight percent of the peanut butter, preferably about 0.05 to 2 weight percent of the peanut butter, and more preferably about 0.5 to 1.5 weight percent of the peanut butter. Typically the salt added to the peanut butter is, but is not limited to, sodium chloride and/or potassium chloride. In another aspect of this embodiment, a natural sweetening agent is added to the peanut butter. The content of the sweetening agent in the peanut butter is typically less than about 10 weight percent of the peanut butter, preferably less than about 6.5 weight percent of the peanut butter, more preferably about 0.5 to 5 weight percent of the peanut butter, and even more preferably about 1 to 4 weight percent of the peanut butter. Natural sweeteners which can be added to the peanut butter include, but are not limited to, sucrose, dextrose, molasses and/or honey.

In accordance with still another aspect of the present invention, the final moisture content of the peanut butter is controlled to obtain an acceptable water activity of the peanut butter and to reduce the rate at which the peanut oil separates from the peanut particles. A water activity that is too great can significantly reduce the shelf-life of the peanut butter product. Too high of a water content in the peanut butter can reduce the effectiveness of the natural stabilizer thereby causing an increase in the settling rate of the peanut particles from the peanut oil in the peanut butter. Typically, the moisture content of the final peanut butter is less than about 10 weight percent of the peanut butter, and preferably less than about 4 weight percent of the peanut butter.

In accordance with yet another aspect of the present invention, the natural stabilizer is formed from one or more natural fatty acids that form a matrix with the peanut oil and peanut particles in the peanut butter thereby inhibiting or preventing the rapid separation of the peanut oil from the peanut particles after the peanut butter has been packaged. The source of the natural fatty acids can be from a number of natural sources such as milk from cows, goats, and the like; milk products naturally formed from cows, goats and the like; nuts, beans, vegetables, and/or seeds. Examples of sources of fatty acids from non-animal products include, but are not limited to, soybean oil, peanut oil, sunflower oil, safflower oil, corn oil, olive oil, canola oil, rice bran oil, mustard seed oil, cottonseed oil poppyseed oil, peanut oil, rapeseed oil, carrot oil, lineseed oil, primrose oil, borage oil, coconut oil, meadowfoam oil, babassu oil, palm oil palm kernel oil, tallow and/or shea butter. Natural fatty acid sources from animal products can include, but are not limited to, whale oil, fish oil, lard, cream, and/or butter from animal milk. In one embodiment, the natural stabilizer constitutes up to about 20 weight percent of the peanut butter, preferably up to about 10 weight percent of the peanut butter, and more preferably about 0.5 to 8 weight percent of the peanut butter. In another embodiment, the natural stabilizer includes at least about 75 weight percent fatty acids, preferably at least about 80 weight percent fatty acids, more preferably at least about 90 weight percent fatty acids, and even more preferably about 95–99.99 weight percent fatty acids. In yet another embodiment, the natural stabilizer includes all saturated fatty acids, all unsaturated fatty acids, or a combination of saturated and unsaturated fatty acids. In still another embodiment, the natural stabilizer includes less than about 5 weight percent water, preferably less than about 2 weight percent water, and more preferably about 0.01–1 weight percent water, and even more preferably about 0.01–0.8 weight percent water. In still yet another embodiment, the composition of the natural stabilizer is such so as to produce a specific solid fat content profile at various temperatures. Solid fat indexes can be determined according to dilatometry using A.O.C.S. Solid fat percentages are generally reported at 0° C. (32° F.), 10° C. (50° F.), 21.1° C. (70° F.), 26.7° C. (80° F.), 33.3° C. (92° F.), 37.8° C. (100° F.), 40.5° C. (105° F.), and 50° C. (122° F.). It has been found having a certain minimum solid fat content at various temperatures will satisfactorily stabilize the peanut oil and peanut particles in the peanut butter. In one aspect of this embodiment, the solid fat index of the natural stabilizer is at least about 30 percent at 10° C. and at least about 5 percent at that a staiblizer 26.7° C. In another specific aspect of this embodiment, the solid fat index is at least about 40 percent at 0° C., at least about 30 percent at 10° C., at least about 8 percent at 21.1° C., at least about 5 percent at 26.7° C., and at least about 1 percent at 33.3° C. In yet another specific aspect of this embodiment, the solid fat index is about 40–90 percent at 0° C., about 30–85 percent at 10° C., about 8–65 percent at 21.1° C., about 5–55 percent at 26.7° C., about 1–38 percent at 33.3° C., about 0.01–25 percent at 37.8° C., about 0–15 percent at 40.5° C., and about 0–5 percent at 50° C. In still yet another specific aspect of this embodiment, the solid fat index is about 72–83 percent at 0° C., about 70–78 percent at 10° C., about 50–60 percent at 21.1° C., about 40–50 percent at 26.7° C., about 25–35 percent at 33.3° C., about 12–24 percent at 37.8° C., about 5–14 percent at 40.5° C., and about 0–2 percent at 50° C. In a further embodiment, the natural stabilizer includes a plurality of fatty acids. Typically, the natural stabilizer includes one or more of the following fatty acids, namely, arachidic acid, butyric acid, caproic acid, caprylic acid, capric acid, lauric acid, linoleic acid, linolenic acid, myristic acid, oleic acid, palmitic acid, palnitoleic acid, and/or stearic acid. In one aspect of this embodiment, the natural stabilizer includes a combination of myristic acid, oleic acid, palmitic acid and stearic acid. In another specific aspect of this embodiment, myristic acid, oleic acid, palmitic acid and stearic acid constitute the majority weight percent of fatty acids in the natural stabilizer. Typically, myristic acid, oleic acid, palmitic acid, and stearic acid constitute at least about 60 weight percent of the fatty acids in the natural stabilizer. Preferably, myristic acid, oleic acid, palmitic acid and stearic acid constitute about 60–99 weight percent of the fatty acids in the natural stabilizer. In another aspect of this embodiment, the natural stabilizer includes about 1–25 weight percent myristic acid, about 2–30 weight percent oleic acid, about 10–45 weight percent palmitic acid and about 5–35 weight percent stearic acid. In yet another aspect of this embodiment, the natural stabilizer includes about 6–15 weight percent myristic acid, about 10–20 weight percent oleic acid, about 22–35 weight percent palmitic acid and about 12–24 weight percent stearic acid. In still yet another aspect of this embodiment, the natural stabilizer includes about 0–5 weight percent arachidic acid, about 0–10 weight percent butyric acid, about 0–10 weight percent caproic acid, about 0–8 weight percent caprylic acid, about 0–8 weight percent capric acid, about 0–10 weight percent lauric acid, about 0–8 weight percent linoleic acid, about 0–8 weight percent linolenic acid, about 7–13 weight percent myristic acid, about 10–20 weight percent oleic acid, about 22–32 weight percent palmitic acid, about 0–8 weight percent palmitoleic acid, and about 13–22 weight percent stearic acid. In still a further embodiment, none of the fatty acids in the natural stabilizer are modified fatty acids. A modified fatty acid is any fatty acid which has been chemically altered in any artificial manner such as, but to not limited to, hydrogenation, esterification, oxidation.

In still yet another aspect of the present invention, the natural stabilizer is partially or fully formed from milk or a milk product from animals. Typically, the source of the milk or milk product is from a cow or goat; however, other animal milk sources can be used. In one embodiment, the natural stabilizer is partially or fully formed from the cream in the milk. When the natural stabilizer is fully or partially formed from cream, the cream, which has been typically homogenized or pasteurized, is dehydrated so as to substantially remove the water from the cream. In one aspect of this embodiment, the moisture content of the cream after water removal is typically less than about 2 weight percent, preferably less than about 1 weight percent, and more preferably about 0.05–0.5 weight percent. In another aspect of this embodiment, the water from the cream is partially or fully removed by heat and/or a centrifuge. In another aspect of this embodiment, the cream is cooled to cause the heavier fatty acids in the cream to partially or fully solidify. The partially and/or fully solidified component of the cooled or chilled cream is used as the natural stabilizer. In still another aspect of this embodiment, the water from the cream is partially or fully removed by heat and/or a centrifuge, and the reduced water cream is then cooled to cause the heavier fatty acids in the reduced water cream to partially or fully solidify. The partially and/or fully solidified component of the cooled or chilled reduced water cream is used as the natural stabilizer. In another embodiment, the natural stabilizer is partially or fully formed from natural butter. When butter is used as a partial or complete source of the natural stabilizer, the water content of the butter is reduced when forming the natural stabilizer. In one aspect of this embodiment, the moisture content of the butter after water removal is typically less than about 2 weight percent, preferably less than about 1 weight percent, and more preferably about 0.05–0.5 weight percent. In another aspect of this embodiment, the water from the butter is removed by melting the butter to cause the water to separate from the fatty acids in the butter. The water is then removed from the fatty acids. In another aspect of this embodiment, the heated butter is cooled to cause the heavier fatty acids in the butter to partially or fully solidify. The partially and/or fully solidified component of the cooled or chilled butter is used as the natural stabilizer. In still another aspect of this embodiment, the water from the butter is partially or fully removed by first heating the butter and then separating the water from the heated butter, and then cooling the reduced water butter to cause the heavier fatty acids in the reduced water butter to partially or fully solidify. The partially and/or fully solidified component of the cooled or chilled reduced water butter is used as the natural stabilizer. In still another embodiment, the natural stabilizer is partially or fully formed from butter and cream. In yet another embodiment, water is added to the processed butter and/or cream such that the water content is about 0.2 to 0.4 weight percent. It has been found that the natural stabilizer, when partially or fully formed from butter and/or cream, that has a water content of about 0.2 to 0.4 adds the desired moisture content to the final peanut butter product.

It is a principal object of the present invention to provide a stabilized peanut butter which resists peanut oil separation from the peanut particles in the peanut butter after packaging.

Another object of the present invention is to provide a peanut butter which can be processed under a wide variety of conditions and temperatures without adverse affect to the product quality.

Yet another object of the present invention is to provide a peanut butter which is formed from all natural ingredients.

It is still another object of the present invention to provide an all natural stabilizer which forms a matrix with the peanut oil and peanut particles in peanut butter to reduce or inhibit separation of the peanut oil from the peanut particles in the peanut butter product.

Still yet another object of the present invention is to provide a natural stabilizer which is partially or fully formed from milk and/or milk products.

A further object of the present invention is to provide a peanut butter which has good melting properties and less waxy taste.

Still a further aspect of the present invention is to provide a peanut butter which has a soft, spreadable consistency and which is stable over time and temperature.

These and other objects and advantages will become apparent to those skilled in the art upon the reading and following of this description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DESCRIPTION OF THE PREFERRED EMBODIMENT

The all natural ingredients of peanut butter of the present invention include a substantially homogeneous mixture of peanuts, peanut oil and a natural stabilizer. The natural stabilizer is formulated to inhibit or prevent the peanut oil from separating from the peanut particles in the peanut butter when the peanut butter is packaged and stored for several weeks or months. As a result, a less messy, visually pleasing, natural ingredient peanut butter product is provided. The typical formulation of the natural ingredient peanut butter is set forth below.

| | |
|---|---|
| Peanuts | 70–98% |
| Salt | 0–3% |
| Sweetener | 0–8% |
| Natural Stabilizer | 0.5–10% |

As indicted above, the essential components of the peanut butter are peanuts and the natural stabilizer. Salt, sweeteners and/or peanut oil can be added to enhance the flavor, mouth feel and/or texture of the final peanut butter product.

Figure 3:
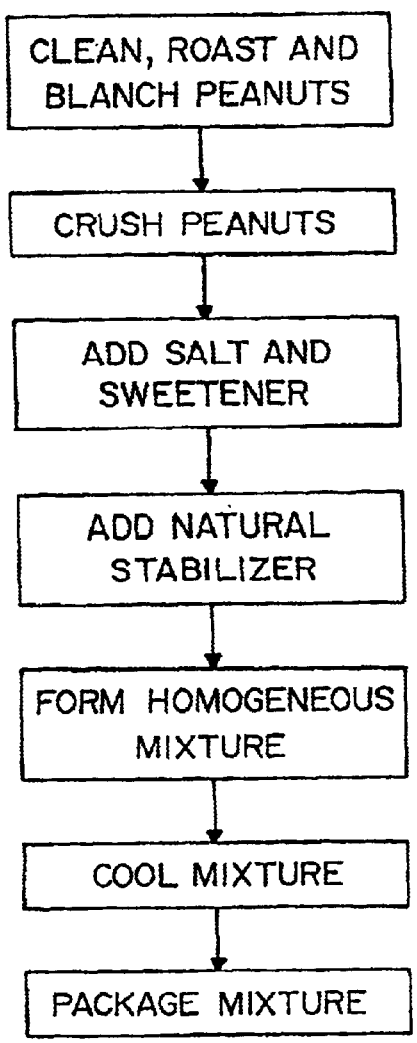
FIG. 3 is a process flow chart illustrating the formation of peanut butter.
Figure 4:
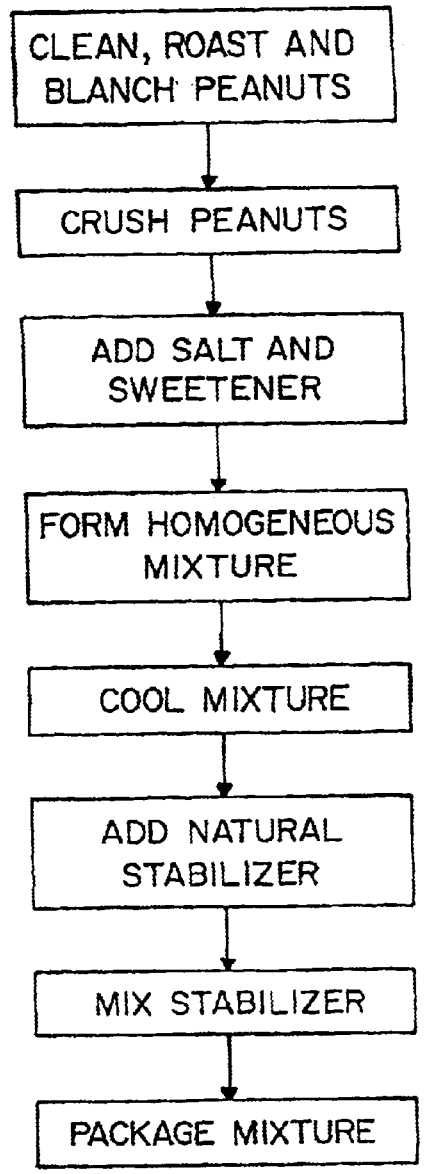
FIG. 4 is a peanut butter process flow chart illustrating an alternative manufacturing process for the formation of peanut butter.

Referring now to the drawings, wherein the showings are for the purpose of illustrating the preferred embodiments of the invention only and not for the purpose of limiting the same, FIGS. 3 and 4 illustrate two processes for producing the natural ingredients in peanut butter. Referring to FIG. 3, the peanuts are cleaned, roasted and blanched to remove unwanted particles from the peanuts and to reduce the moisture content of the peanuts prior to grinding the peanuts. The blanching of the peanuts can be skipped. The roasted and cleaned peanuts are then crushed by using conventional grinding equipment to form a pasty mixture of peanut oil and crushed peanut particles. After the peanuts have been crushed salt and/or a sweetener, if used, are added to the pasty mixture. The natural fatty acid stabilizer is also added to the pasty mixture. The peanut oil, peanut particles, stabilizer and other natural ingredients are homogeneously mixed together in a heated environment of about 150°–200° F. Thereafter, the homogeneous mixture is cooled to a temperature below at least about 100° F., typically by chillers, to form the final peanut butter product. After the peanut butter product is cooled, the peanut butter is packaged.

An alternative manufacturing process for the peanut butter is illustrated in FIG. 4. As shown in FIG. 4, the peanuts are cleaned, roasted and blanched to remove unwanted particles from the peanuts and to reduce the moisture content of the peanuts prior to grinding the peanuts. The blanching of the peanuts can be skipped. The roasted and cleaned peanuts are then crushed by using conventional grinding equipment to form a pasty mixture of peanut oil and crushed peanut particles. After the peanuts have been crushed, salt and/or a sweetener, if used, are added to the pasty mixture. The peanut oil, peanut particles, and other natural ingredients (i.e. salt and for sweetener) are homogeneously mixed together in a heated environment of about 150°–200° F. Thereafter, the homogeneous mixture is cooled to a temperature below at least about 100° F., typically by chillers. The natural stabilizer is added and mixed with the cooled homogeneous mixture to form the final peanut butter product. After the peanut oil, peanut particles, stabilizer and natural ingredients have been thoroughly mixed together, the peanut butter is packaged. It is understood that the invention is not to be limited to any particular manner of making peanut butter, or by introducing the natural stabilizer into the peanut oil and peanut particle paste.

The natural stabilizer for the peanut butter can be derived from a variety of natural sources such as milk and/or milk products from animals, nuts, beans, vegetables and/or seeds. The natural stabilizer includes one or more fatty acids which form a matrix with the peanut oil and peanut particles in the peanut butter. The matrix forms a firm butter product which reduces or prevents the peanut oil from separating from the peanut particles.

The fatty acid content of the natural stabilizer is selected to form a stabilizer having a certain solid fat profile. The general solid fat index of the natural stabilizer is set forth below.

| Temp (° C.) | SFI Range |
|---|---|
| 0° | 40–90 |
| 10° | 30–85 |
| 21.1° | 8–65 |
| 26.7° | 5–55 |
| 33.3° | 1–38 |
| 37.8° | 0.01–25 |
| 40.5° | 0–15 |
| 50° | 0–5- |

In one preferable embodiment, the natural stabilizer has the following solid fat index.

| Temp (° C.) | SFI Range |
|---|---|
| 0° | 72–83 |
| 10° | 70–78 |
| 21.1° | 50–60 |
| 26.7° | 40–50 |
| 33.3° | 25–35 |
| 37.8° | 12–24 |
| 40.5° | 5–14 |
| 50° | 0–2- |

The fatty acid composition of the natural stabilizer is typically formed from a combination of fatty acids. The size of the fatty acid chains generally range from about 12–20 carbons in length; however, small amounts of larger or smaller fatty acids can be included in the natural stabilizer.

In one particular natural stabilizer, which can be used to stabilize peanut butter, the fatty acids of myristic acid, oleic acid, palmitic acid and stearic acid make up at least a majority of the fatty acids in the natural stabilizer. In one preferable natural stabilizer, the content of such fatty acids are as follows

| | |
|---|---|
| myristic acid | 1–25% |
| oleic acid | 2–30% |
| palmitic acid | 10–45% |
| stearic acid | 5–35% | and more preferably,

| | |
|---|---|
| myristic acid | 6–15% |
| palmitic acid | 22–35% |
| oleic acid | 10–20% |
| stearic acid | 12–24% |

In one particular natural stabilizer, the fatty acid content of the natural stabilizer is as follows:

| | |
|---|---|
| arachidic acid | 0–5 |
| butyric acid | 0–10 |
| caproic acid | 0–10 |
| caprylic acid | 0–8 |
| capric acid | 0–8 |
| lauric acid | 0–10 |
| linoleic acid | 0–8 |
| linolenic acid | 0–8 |
| myristic acid | 7–13 |
| oleic acid | 10–20 |
| palmitic acid | 22–32 |
| palmitoleic acid | 0–8 |
| stearic acid | 13–22 |

The fatty acid content of the natural stabilizer is at least about 80 weight percent fatty acids and preferably at least about 90 weight percent fatty acids and more preferably about 95 to 99.99 weight percent fatty acids. The natural stabilizer also includes a small amount of water typically constituting no more than about 4 percent of the natural stabilizer, preferably less than about 2 percent, and more preferably about 0.01–1 percent.

Figure 1:
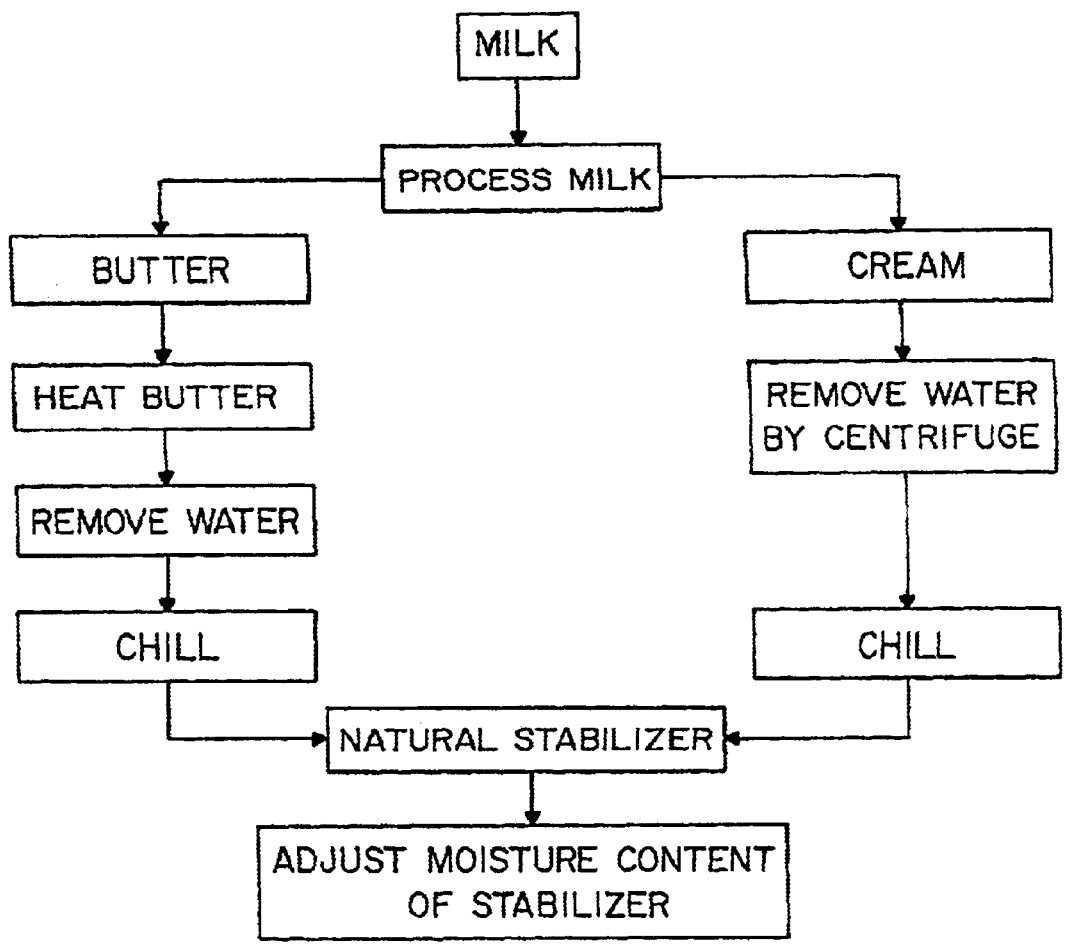
FIG. 1 is a process flow chart illustrating the formation of the natural stabilizer from milk.

Referring to FIG. 1, a process is illustrated for the formation of the natural stabilizer from a milk product from a cow, goat or the like. As shown in FIG. 1, the milk is processed to form butter or cream. During the processing of the milk, the milk is typically homogenized and pasteurized to remove bacteria and any other impurities in the natural milk. When the natural stabilizer is derived from butter, the butter is preferably a non-salted, natural butter. The butter is heated above its melting point to cause the water in the butter to separate from the fats, fat globules and fatty acids in the butter. Most of the water from the melted butter is then removed leaving the fatty acids and other non-water products behind. The reduced water product is then cooled or chilled to cause the heavier fatty acids to partially or fully solidify. The reduced water product is typically cooled to about −10° C. to 10° C. The partially and fully solidified substantially anhydrous milkfat constitutes the natural stabilizer. When the natural stabilizer is formed from cream, the water in the cream is removed by a centrifuge. After most of the water is removed, the remaining components of the cream are then cooled or chilled to cause the heavier fatty acids to partially or fully solidify. The reduced water product is typically cooled to about −10° C. to 10° C. The partially and fully solidified substantially anhydrous milkfat constitutes the natural stabilizer. Prior to adding the natural stabilizer to the peanut particle and peanut oil paste, the moisture content of the natural stabilizer can be adjusted if desired. If the moisture content is being adjusted, the moisture content of the natural stabilizer is adjusted to be about 0.01 to 1 percent water, preferably about 0.1 to 0.7 percent water, and more preferably about 0.3 to 0.5 percent water. Me natural stabilizer having this particular moisture content has been found to provide excellent stabilizing properties with the final peanut butter product.

A particular example of the fatty acid composition of a natural stabilizer derived from processed milk is as follows:

| | |
|---|---|
| arachidic acid | 0–1% |
| butyric acid | 1–5% |
| caproic acid | 1–5% |
| caprylic acid | 1–3% |
| capric acid | 1–4% |
| lauric acid | 2–5% |
| linoleic acid | 0.5–3% |
| linolenic acid | 0.5–3% |
| myristic acid | 8–12% |
| palmitic acid | 25–30% |
| palmitoleic acid | 1–3% |
| oleic acid | 12–18% |
| stearic acid | 15–20% |

The natural stabilizer has a smooth to waxy texture, and has a yellow to golden color at about 60° C. and a white to pale yellow color when in solid form. The smell of the product is buttery but does not have any off odors. The taste of the product is bland to a buttery flavor. The dropping point using the natural stabilizer is about 42° to 47° C. The free fatty acid content of the natural stabilizer is no more than about 0.5 weight percent and the fat content is at least about 99 weight percent. The solid fat index of this product is illustrated by line A in FIG. 2 and is as follows:

| Temp (° C.) | Solid Content |
|---|---|
| 0 | 76–80% |
| 10 | 73–77% |
| 21.1 | 53–57% |
| 26.7 | 42–46% |
| 33.3 | 27–31% |
| 37.8 | 16.5–19.3% |
| 40.5 | 9–12% |
| 50 | 0–1% |

Figure 2:
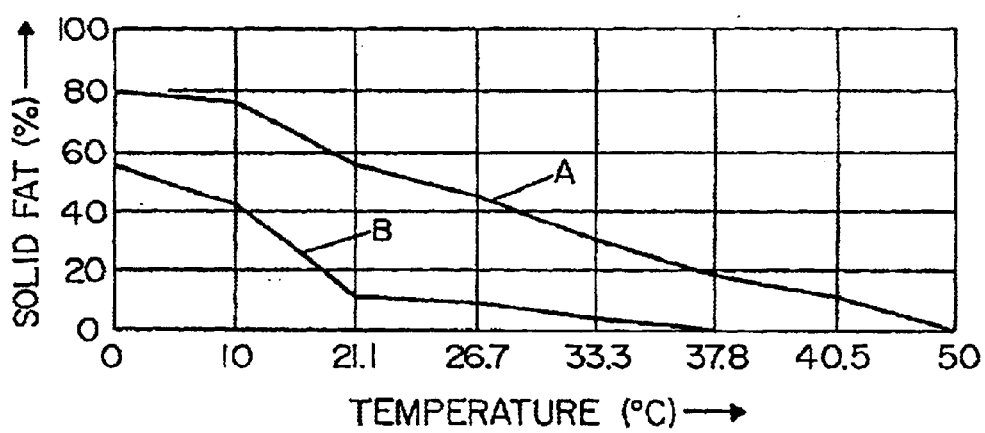
FIG. 2 is a solid fat index of he natural stabilizer.

Line B of FIG. 2 illustrates the solid fat index of the natural stabilizer when the cooling or chilling step is eliminated. The solid fat index of this product is as follows:

| Temp (° C.) | Solid Content |
|---|---|
| 0 | 55–58% |
| 10 | 40–43% |
| 21.1 | 12–14.5% |
| 26.7 | 8–10.5% |
| 33.3 | 2.5–5% |
| 37.8 | 0–0.4% |
| 40.5 | 0% |
| 50 | 0% |

The following examples illustrate a typical preparation of the natural ingredient peanut butter. The examples are illustrative in nature and do not limit the invention thereto.

EXAMPLE 1

Peanuts were roasted, blanched and cleaned to remove foreign materials from the peanuts. The peanuts were then fed into a mill which crushed the roasted peanuts therebetween. The peanuts were forced out of the mill in the form of fine peanut particles in oil. The ground product had a temperature of about 65.56–76.67° C. About 0.5 to 1.5 weight percent sodium chloride and preferably up to 3 weight percent natural sweetening agent were added to fine peanut particles in oil. The salt, sweetening agent, peanut particles and peanut oil were throughly mixed to form a substantially homogeneous mixture. Five to six weight percent of a solid natural stabilizer derived from butter which included the chilling step was added to the peanut mixture. The natural stabilizer has a dropping point of about 44–46° C., a fat content of about 99.7–99.9 weight percent, and a moisture content of less than about 0.3 weight percent. The natural stabilizer was throughly mixed into the peanut mixture while the peanut mixture was maintained at a temperature of about 71.1–93.3° C. The peanut mixture was then cooled to a temperature between about 10–37.78° C. After the peanut mixture was cooled, the peanut mixture was gently mixed and agitated and placed into jars for final packaging.

EXAMPLE 2

The peanuts were clean, roasted, blanched and then crushed similar to Example 1. About 0.3 to 1 weight percent sodium chloride and about 0.5 to 2 weight percent honey were added to the fine peanut particles in oil. The salt, honey, peanut particles and peanut oil were mixed together at a temperature of about 65.56–93.3° C. until a substantially homogenous mixture was formed. The mixture was then cooled to a temperature of about 26.67–37.78° C. About 6 to 8 weight percent of a liquid natural stabilizer derived from cream including the chilling step was added to the cooled peanut mixture. The natural stabilizer has a dropping point of about 42–44° C., a fat content of about 99.6–99.8 weight percent, and a moisture content of less than about 0.4 weight percent. The natural stabilizer was substantially homogeneously mixed with the peanut mixture and then further cooled and transferred to jars for final packaging.

The invention has been described with reference to a preferred embodiment and alternates thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

Having thus described the invention, I claim:

1. A method of making a peanut butter containing essentially all natural ingredients comprising:
   a) grinding roasted peanuts to form a paste of peanut particles and peanut oil;
   b) adding a natural stabilizer which at least partially prevents separation of said peanut particles and said peanut oil in said paste, wherein said natural stabilizer is partially or fully derived from a natural source selected from the group consisting of milk and milk products, and wherein when said natural stabilizer is partially derived from the group consisting of milk and milk products said natural stabilizer is further derived from the group consisting of nuts, beans, vegetables, seeds, and combinations thereof, wherein said natural stabilizer comprises less than about 5% water by weight and at least about 80% fat by weight, said fat including a plurality of natural fatty acids and having a solid fat index of at least about 50% water at temperature between 10–21.1° C., and a solid fat index greater than 0% at a temperature of 40.5° C.; and wherein said natural stabilizer is at least partially formed by the steps of:
      1) obtaining cream from milk and/or a milk product;
      2) removing water from said cream until the fat content of said cream is at least about 95 weight percent and the water content is about 0.01–2 weight Percent
      3) chilling the cream after said water has been removed; and
      4) separating the partially solid and solid particles from the chilled cream for use in said natural stabilizer; and
   c) mixing said natural stabilizer with said peanuts to form a stable peanut butter product.

2. A method of making a peanut butter containing essentially all natural ingredients comprising:
   a) grinding roasted peanuts to form a paste of peanut particles and peanut oil;
   b) adding a natural stabilizer which at least partially prevents separation of said peanut particles and said peanut oil in said paste, wherein said natural stabilizer is partially or fully derive from a natural source selected from the group consisting of milk and milk products, and wherein when said natural stabilizer is partially derived from the group consisting of milk and milk products said natural stabilizer is further derived from the group consisting of nuts, beans, vegetables, seeds, and combinations thereof, wherein said natural stabilizer comprises less than about 5% water by weight and at least about 80% fat by weight, said fat including a plurality of natural fatty acids and having a solid fat index of at least about 50% at temperature between 10–21.1° C., and a solid fat index greater than 0% at a temperature of 40.5° C.; and wherein said natural stabilizer is at least partially formed by the steps of:
      1) obtaining butter formed from milk, milk products and/or natural, non-hydrogenated oils;
      2) melting the butter until water in said butter at least partially separates from the fatty acids in said butter;
      3) removing said water until said fat content is at least about 95 weight percent and the water content is about 0.01–2 weight percent.
      4) chilling the butter after said water has been removed; and
      5) separating the partially solid and solid particles from the chilled butter for use in said natural stabilizer; and
   c) mixing said natural stabilizer with said peanuts to form a stable peanut butter product.

3. A method of making a peanut butter containing essentially all natural ingredients comprising:
   a) grinding roasted peanuts;
   b) adding a natural stabilizer to said peanuts, said natural stabilizer comprising a fat, said fat including at least about 80% natural fatty acids and less than about 5% water, said natural fatty acids including a plurality of different fatty acids, said fatty acids having a solid fat index of at least about 50% at temperature between 10–21.1° C., and a solid fat index greater than 0% at a temperature of 40.5° C., a majority to all of said fatty acids obtained from a natural source selected from the group consisting of milk, milk products, and wherein the remainder of said fatty acids are obtained from the group consisting of nuts, beans, vegetables, seeds, and combinations thereof; wherein said natural stabilizer is at least partially produced by the steps of:
1) obtaining cream from milk and/or a milk product;
2) removing water from said cream until the fatty acid content of said cream is at least about 95 weight percent and the water content is about 0.01–2 weight percent.
3) chilling the cream after said water has been removed; and
4) separating the partially solid and solid particles from the chilled cream for use in said natural stabilizer; and c) mixing said natural stabilizer with said peanuts to form a stable peanut butter product.

4. A method of making a peanut butter containing essentially all natural ingredients comprising:
a) grinding roasted peanuts;
b) adding a natural stabilizer to said peanuts, said natural stabilizer comprising a fat, said fat including at least about 80% natural fatty acids and less than about 5% water, said natural fatty acids including a plurality of different fatty acids, said fatty acids having a solid fat index of at least about 50% at temperature between 10–21.1° C., and a solid fat index greater than 0% at a temperature of 40.5° C., a majority to all of said fatty acids obtained from a natural source selected from the group consisting of milk, milk products, and wherein the remainder of said fatty acids are obtained from nuts, beans, vegetables, seeds, and combinations thereof; wherein said natural stabilizer is at least partially produced by the steps or:
1) obtaining butter formed from milk, milk products and/or natural, non-hydrogenated oils;
2) melting the butter until water in said butter at least partially separates from the fatty acids in said butter;
3) removing said water until said fatty acid content is at least about 95 weight percent and the water content is about 0.01–2 weight percent.
4) chilling the butter after said water has been removed; and
5) separating the partially solid and solid particles from the chilled butter for use in said natural stabilizer; and c) mixing said natural stabilizer with said peanuts to form a stable peanut butter product.

* * * * *